G. L. WELLER.
WATER METER.
APPLICATION FILED JUNE 6, 1912.
1,058,121.
Patented Apr. 8, 1913.
2 SHEETS—SHEET 2.
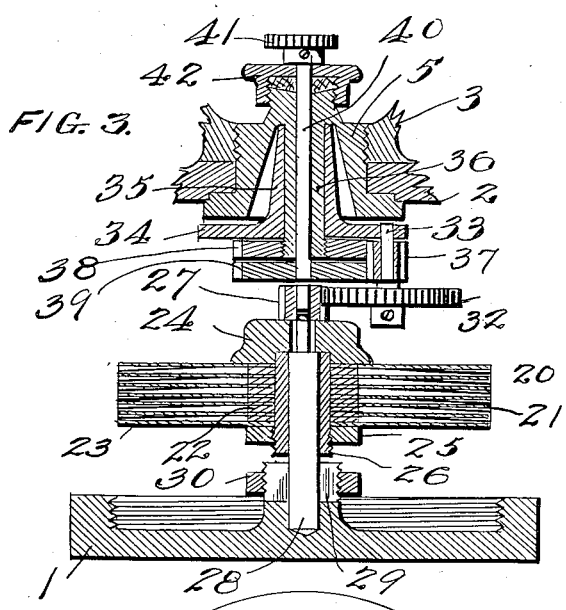
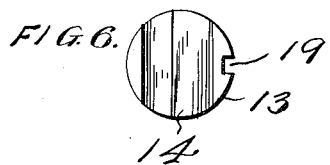
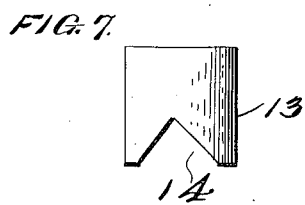
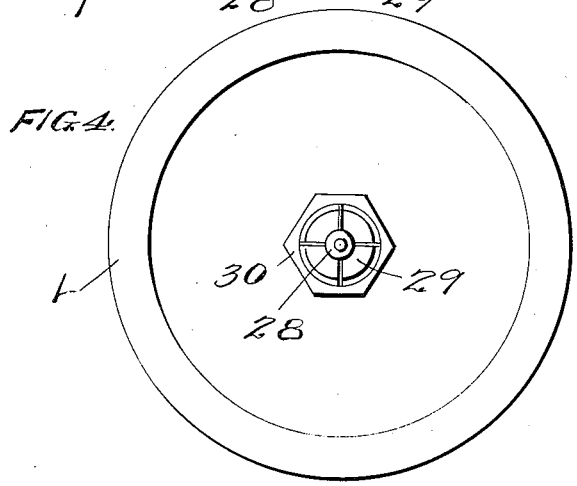
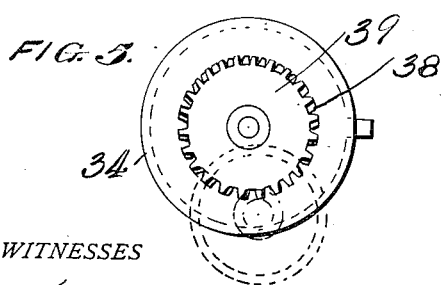
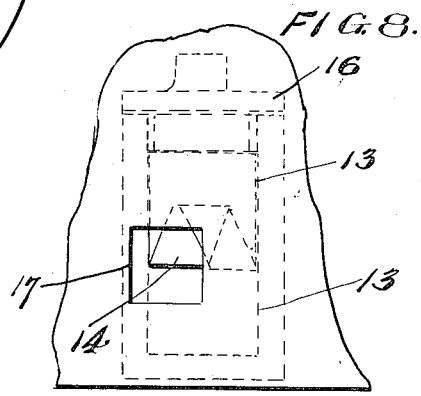
WITNESSES
George L. Weller
INVENTOR
Attorney

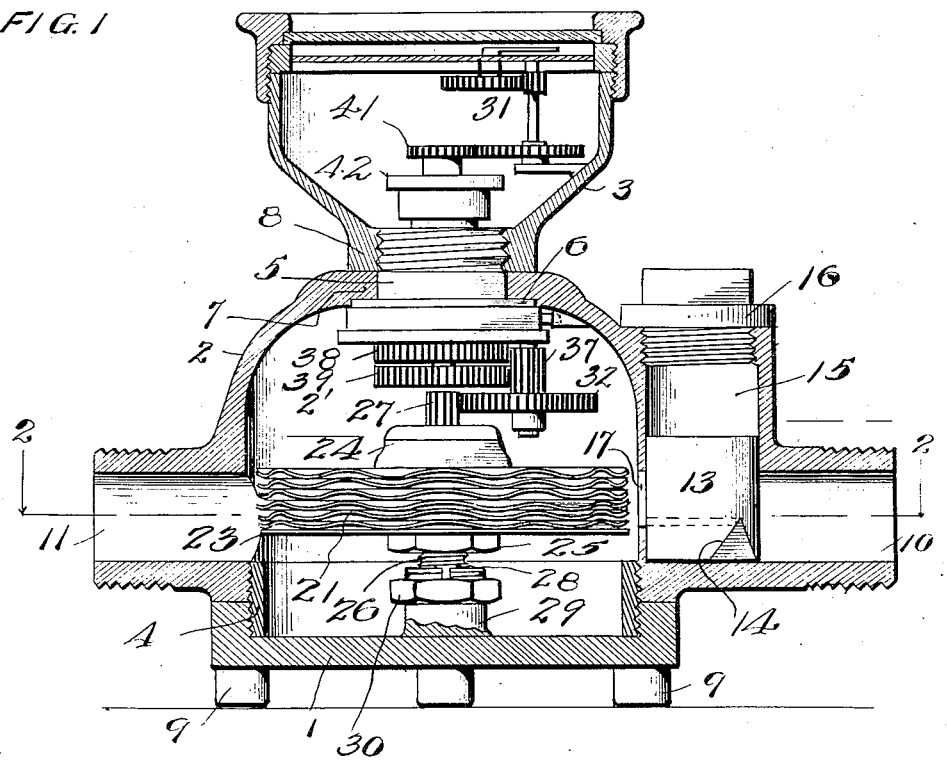
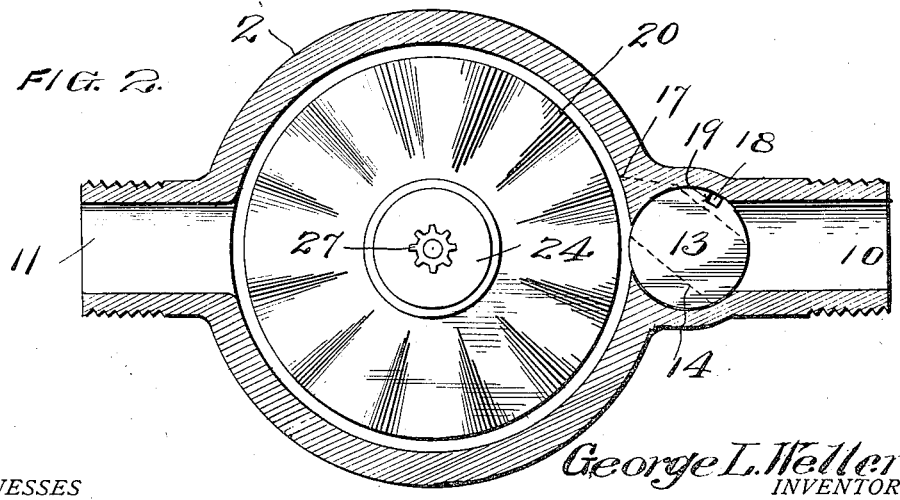

UNITED STATES PATENT OFFICE.

GEORGE L. WELLER, OF ELYRIA, OHIO, ASSIGNOR OF THREE-FOURTHS TO WILLIAM G. SHARP, OF ELYRIA, OHIO.

WATER-METER.

1,058,121.   Specification of Letters Patent.   Patented Apr. 8, 1913.

Application filed June 6, 1912.   Serial No. 702,088.

*To all whom it may concern:*

Be it known that I, GEORGE L. WELLER, a citizen of the United States, residing at Elyria, in the county of Lorain and State of Ohio, have invented certain new and useful Improvements in Water-Meters, of which the following is a specification.

My present invention relates to an improved water meter of the rotary type, and is designed to provide a device of this character in which the parts may be assembled or dismantled with facility, which will be efficient in operation, comparatively cheap in first cost and will require but a minimum cost for repairs.

The invention consists in certain novel features of construction and combinations and arrangements of parts as will be hereinafter described, and more clearly pointed out in the appended claims.

In the accompanying drawings I have illustrated one example of the physical embodiment of my invention constructed according to the best mode I have so far devised for the practical application of the principles.

Figure 1 is a vertical central sectional view through the assembled casing, showing the operative parts in elevation. Fig. 2 is a horizontal sectional view on line 2—2 Fig. 1. Fig. 3 is a vertical, central sectional view of the working parts of the meter. Fig. 4 is a plan view of the base portion of the meter casing, showing the supporting post for the rotary wheel of the meter. Fig. 5 is a plan view of a pair of reduction gears. Fig. 6 is a bottom plan view of the nozzle plug. Fig. 7 is a side elevation of the plug. Fig. 8 shows the inlet port of the meter with the nozzle plug in dotted lines.

In the preferred embodiment of my invention the meter casing comprises the bottom portion 1, the water wheel-casing 2 and the register casing 3, the former two parts being connected by the comparatively thin exteriorly threaded ring 4 to which they are screwed, and the register casing being secured to the wheel casing by means of a threaded sleeve 5, provided with a shoulder or disk 6, and as will be clearly seen in Fig. 1 the restricted neck 7 of the casing 2 is clamped between the disk 6 and the neck 8 of the casing 3. The bottom portion 1 is provided with lugs 9 forming feet upon which the meter may rest, in addition to their function for use in unscrewing the bottom from the ring 4. A specially meritorious feature of this construction embodying the thin metallic ring 4 is the fact this ring or nipple, because of its comparative weakness at the joint between the bottom 1 and the casing 2, will break at a frost pressure of about 200 lbs. per square inch, and the breaking of the ring permits the bottom to drop out, and thus prevents injury or ruin of the remainder of the meter.

The chamber 2' within the casing 2 is provided with an inlet 10 and diametrically oppositely located outlet 11, and within the inlet pipe 10 is located a plug 13 in the bottom or lower end of which is cut a V-shaped groove 14. The plug 13 is slidable in the vertical chamber 15 whose walls are formed integral with the casing 2, and the open, upper end of the casing is closed by a screw plug 16, which also forms an obstruction to excessive lift of the plug 13. When in its lowered position, as shown in Fig. 1, and not under pressure, the plug closes the port 17, but it will be observed that a triangular shaped opening is provided communicating with the port 17 at the upper point of the V-shaped groove 14. This small opening allows the meter to drain, and also provides an inlet for a small stream when the meter is being tested on a small opening. The plug 13 is free to slide up and down in the chamber 15, to adjust itself to the size of the stream flowing through the inlet, and is prevented from turning on its vertical axis by means of the pin 18 traveling in the groove 19 in the outer face of the plug. The plug is loose in its chamber, and this construction, together with the groove 19 permits movement of air or water in order to prevent compression and undue resistance above the plug. As clearly seen in Fig. 2, the plug is located in proper position to direct a stream of water through the port 17 at a tangent to the circumference of the water wheel 20. The function of the plug is primarily to regulate the size of the stream of water passing through its V-shaped groove, and the plug is raised or held in suspension by the water pressure from the inlet side of the plug. The plug causes a slight back pressure of water and thus maintains a constant velocity of the inlet stream against the wheel 20. Thus, if the meter were being tested on a stream $\frac{1}{16}''$ in diameter on the outlet side and the port 17 was not obstructed by the plug, the velocity of the stream through this port and against the water wheel would be so slow that it would not turn the wheel. Whereas with the plug in place the water is restricted to pass through the V-shaped groove whose area corresponds to a $\frac{1}{16}''$ stream and the stream impinging against the wheel is of this cross sectional area, and the concentrated stream is sufficient to turn the water wheel. If a $\frac{1}{8}''$ or $\frac{1}{4}''$ stream were being used, the plug would be lifted high enough to pass such a stream, and when the full sized stream is passed, the water pressure lifts the plug to its extreme height.

The water wheel 20 is made up of a series of disks 21, preferably of aluminum and corrugated, as shown, and separated by washers, as 22. The disks are held between the plate 23 and the cap 24, by means of the nut 25 which is screwed on the threaded member 26 extending through the washers 22. At its upper end the cap 24 has fixed thereto a small pinion 27 that is rotatable with the water wheel 20. The water wheel is supported to rotate upon a post 28, fixed in the split hub 29 by means of the clamping nut 30, and the impact of the stream of water flowing through the port 17 and striking against the corrugated disks rotates the wheel 20 with its small pinion 27. The rotary motion of the small pinion 27 is transmitted to the registering mechanism 31 located in the register casing, through a novel arrangement of reduction gears as follows: Pinion 27 engages and rotates the larger gear 32. This gear is rotatable on the post 33 secured in the disk or plate 34, and the plate has an integral hub 35 rotatable on the downwardly extended sleeve 36 of the sleeve or bushing 5. Thus the rotation of the pinion 27 counter-clockwise, causes the gear 32 and the plate 34 to revolve clockwise with the gear 32 running around the pinion 27. A long pinion 37 engages the two gears 38 and 39, and of the gears the former, 38, is fixed by screw threads on the sleeve 36, while the latter is fixed to the spindle 40 that is free to rotate within the sleeve 36 and carries an upper gear 41. A stuffing box 42 is screwed on the upper threaded end of the bushing 5. Thus the gear 38 is stationary and the gear 39 is free to rotate, and as the gear 38 is provided with one tooth more than the gear 39, in the rotation of gear 32 and pinion 37 around gear 38, each revolution will move gear 39 one tooth, thus providing the necessary reduction with only three gears. The rotation of the spindle 40 and gear 41 actuates the registering mechanism 31 in the usual or any other suitable manner.

The registering mechanism is inclosed by a glass plate in the upper open end of the register casing so that the meter may be read with accuracy, and the parts be protected.

The different parts of the meter, with the exception of the water wheel, may be constructed of brass, and the parts are assembled without the use of either bolts or screws, and when assembled may be dismantled by unscrewing the bottom from the casing, and then unscrewing the register case from the wheel case, thus releasing the train of gears.

Having thus fully described my invention, what I claim as new and desire to secure by Letters Patent is:

1. The combination in a water meter comprising a wheel casing having an open end, a thin ring threaded into the open end of said casing and a bottom portion threaded to said ring, and a register case connected to said wheel case.

2. The combination in a water meter having an entrance port and formed with a chamber adjacent thereto, of a plug closing the open end of said chamber and a movable plug within the casing having a groove to register with said port.

3. In a water meter the combination with a wheel chamber having an inlet port and an outlet and a wheel in the chamber, of a cylindrical plug adapted to close said port and movable by flowing water but formed with a groove to provide a variable opening alining with the port, and means to prevent rotary movement of said plug.

In testimony whereof I affix my signature in presence of two witnesses.

GEORGE L. WELLER.

Witnesses:
T. A. CONWAY,
H. A. POUNDS.